United States Patent Office 3,226,298
Patented Dec. 28, 1965

3,226,298
PROCESS FOR MAKING HIGH PURITY RADIO-ACTIVE IODINE-131
Wayne J. Gemmill, Milford, Pa., assignor to Union Carbide Corporation, a corporation of New York
No Drawing. Filed Oct. 24, 1963, Ser. No. 318,531
4 Claims. (Cl. 176—10)

This invention relates to a method of producing high purity radioactive iodine-131, also referred to as $I^{131}$, by irradiating tellurium dioxide with thermal neutrons. More specifically, the invention relates to a method for treating tellurium dioxide ($TeO_2$) prior to irradiation. This treatment eliminates the need for chemical purification of the $TeO_2$ hitherto thought essential.

It is known that $I^{131}$ may be prepared from tellurium dioxide by irradiation in a suitable reactor, see, for example, British Patent No. 763,865. The prior art methods, however, as described in an article entitled "A New Method for Separation of Radioactive Iodine-131" by Kjell Taugbol and Knut Samsahl in Jenner Report No. 34 (1954) require that commercially available tellurium dioxide be subjected to chemical purification prior to irradiation in order to produce $I^{131}$ of sufficient purity. Such purification is accomplished by first dissolving tellurium with hot hydrochloric acid and then precipitating it with ammonium hydroxide. This chemical method has been used to prepare the high purity $TeO_2$ required.

The chemical purification method, however, is not only time consuming and expensive, but has the additional disadvantage of introducing into the material to be irradiated chemical impurities, such as small amounts of ammonium chloride. These impurities if retained in the $TeO_2$ will upon heating cause reduction of the $TeO_2$ to elemental tellurium. Since $I^{131}$ is used for medical research and other clinical purposes even the slightest contamination is unacceptable.

It is an object of this invention to provide a more efficient method of producing high purity radioactive iodine-131 from tellurium dioxide.

It is another object of this invention to provide a method of purifying tellurium dioxide prior to irradiation which method eliminates the need for chemical purification.

It is still another object of this invention to treat tellurium dioxide in a manner which will permit more efficient separation of tellurium dioxide from radioactive iodine-131.

It has now been discovered that the aforementioned and other objects can be achieved by heating commercially available tellurium dioxide for one hour or longer at a temperature in the range of about 550° C. to about 600° C. prior to irradiation. At a temperature below about 550° C. the desired results are not obtained. Heating $TeO_2$ above 600° C. results in poor yields of $I^{131}$. It has been found that heating must continue for at least one hour in order to obtain the desired results. While longer heating periods have no adverse effect upon the material, no beneficial results are obtained thereby. The heating is carried out in an oxygen containing atmosphere, such as air or pure oxygen in order that impurities be oxidized. Heating accomplishes a two-fold purpose. First, it insures substantially complete removal of elemental tellurium. Under vacuum and heating, tellurium will distill from the irradiated $TeO_2$ at a temperature lower than that required to separate the $I^{131}$ from the $TeO_2$ lattice structure. Such tellurium would contaminate the $I^{131}$ product. Second, heating appears to alter the lattice structure of the tellurim dioxide in such manner that subsequent dry distillation of $I^{131}$ from the $TeO_2$ is greatly facilitated.

The method of this invention provides considerable reduction in processing time. The prior art chemical purification method requires 6–18 hours to complete, while the heating purification step of this invention requires only one hour. In addition, the post irradiation distillation time of the prior art methods is 4–6 hours as compared with a one hour distillation time for this invention. Excluding irradiation time which remains the same, the overall processing time of this invention is 2 hours as compared with a minimum of 10 hours for the prior art methods. Thus, a five-fold improvement in processing time is achieved.

In order to more fully understand the invention the following example is given by way of illustration only and is not intended to limit the scope of this invention in any manner.

*Example*

300 grams of finely ground commercially available $TeO_2$ were heated for one hour at 575° C. in a quartz container, cooled to room temperature, and then divided among 10 aluminum cans, each containing 30 grams. These aluminum cans were placed in a reactor core having a neutron flux of $2.5 \times 10^{13}$ neutrons/cm.²/sec. and irradiated for 72 hours. By calculation the $I^{131}$ activity produced is 8.65 curies. After removal of the aluminum cans from the reactor core, the $I^{131}$ was separated from the $TeO_2$ by conventional dry distillation methods. The radioactive iodine-131 distilled in about one hour at a temperature of 600° C. to 700° C. under vacuum. The $I^{131}$ was condensed in a cold trap and subsequently dissolved in a solution of 0.1 N sodium hydroxide. The $I^{131}$ recovered was about 80% of the calculated amount of $I^{131}$ produced.

The present invention has several distinct advantages over the prior art. These include the absence of any introduced chemical impurities, considerable reduction in pre-irradiation purification and distillation time, and the production of a product of extremely high purity.

What I claim is:
1. A method of producing radioactive iodine-131 which comprises the steps of
   (1) heating tellurium dioxide at a temperature of from about 550° C. to 600° C. for at least one hour
   (2) irradiating the tellurium dioxide with thermal neutrons and
   (3) separating the radioactive iodine-131 formed from the residual tellurium dioxide by distillation.
2. A method as set forth in claim 1 wherein the tellurium dioxide is heated at a temperature of about 575° C. prior to irradiation.
3. A method of producing high purity radioactive iodine-131 which comprises the steps of
   (1) heating finely ground tellurium dioxide at a temperature of 550° C. to 600° C. for at least one hour
   (2) irradiating the tellurium dioxide with thermal neutrons, and
   (3) separating the radioactive iodine formed from the residual tellurium dioxide by dry distillation at a temperature of 600° C. to 700° C. under vacuum.
4. A method as set forth in claim 3 wherein the tellurium dioxide is heated at a temperature of about 575° prior to irradiation.

References Cited by the Examiner
FOREIGN PATENTS
877,333   9/1961   Great Britain.
877,335   9/1961   Great Britain.

CARL D. QUARFORTH, *Primary Examiner.*
REUBEN EPSTEIN, *Examiner.*